US006530123B1

(12) United States Patent
Wahlstedt (10) Patent No.: US 6,530,123 B1
(45) Date of Patent: Mar. 11, 2003

(54) CLIP FRICTION HINGE WITH HOUSING (75) Inventor: David Wahlstedt, Minneapolis, MN (US)

(73) Assignee: Reell Precision Manufacturing Corporation, St. Paul, MN (US)

(*) Notice: Subject to any disclaimer, the term of this patent is extended or adjusted under 35 U.S.C. 154(b) by 0 days.

(21) Appl. No.: 09/836,902

(22) Filed: Apr. 17, 2001

(51) Int. Cl.⁷ .......................... E05C 17/64; E05D 11/08
(52) U.S. Cl. .............................. 16/342; 16/337; 16/386
(58) Field of Search .......................... 16/342, 337, 338, 16/341, 257, 386; 188/83; 296/97.12, 97.13; 361/680–683; 403/297, 300

(56) References Cited

U.S. PATENT DOCUMENTS

| | | | |
|---|---|---|---|
| 4,897,873 A | 1/1990 | Beutler et al. .............. 379/433 |
| 5,446,788 A | 8/1995 | Lucey et al. ................ 379/430 |
| 5,464,083 A * | 11/1995 | Arnold et al. ................ 16/337 |
| 5,542,505 A | 8/1996 | Kempf ........................ 188/77 |
| 5,632,066 A * | 5/1997 | Huong ........................ 16/338 |
| 5,677,701 A | 10/1997 | Okuyama et al. .............. 345/7 |
| 5,697,125 A | 12/1997 | Gannon ...................... 116/342 |
| 5,771,539 A | 6/1998 | Wahlstedt et al. ............ 16/285 |
| 5,819,374 A | 10/1998 | Chiles et al. .................. 24/16 |
| 5,823,603 A | 10/1998 | Crotty, III ................ 296/97.12 |
| 5,828,015 A | 10/1998 | Coulon ......................... 200/5 |
| 5,845,366 A | 12/1998 | Kuroda ........................ 16/229 |
| 5,864,922 A | 2/1999 | Kraft .......................... 16/266 |
| 5,871,017 A | 2/1999 | Mayer ........................ 128/897 |
| 5,937,062 A | 8/1999 | Sun et al ..................... 379/433 |
| 5,950,281 A * | 9/1999 | Lu .............................. 16/337 |
| 5,983,083 A | 11/1999 | Horne ......................... 455/90 |
| 6,038,739 A * | 3/2000 | Katoh .......................... 16/329 |
| 6,053,458 A | 4/2000 | Meyer ....................... 248/74.1 |
| 6,065,187 A | 5/2000 | Mischenko ................... 16/341 |
| 6,085,384 A | 7/2000 | Bivens ........................... 16/54 |
| 6,230,365 B1 * | 5/2001 | Lu ............................... 16/16 |
| 6,256,838 B1 * | 7/2001 | Lu ............................. 16/273 |
| 6,301,748 B1 * | 10/2001 | Su-Man ...................... 16/337 |

FOREIGN PATENT DOCUMENTS

| | | | |
|---|---|---|---|
| JP | 9-41781 | * | 9/1997 |
| JP | 2001-12514 | * | 1/2001 |
| JP | 2001-32822 | * | 2/2001 |

* cited by examiner

*Primary Examiner*—Chuck Y. Mah
(74) *Attorney, Agent, or Firm*—Kinney & Lange, P.A.

(57) ABSTRACT

The present invention is a friction torque hinge and method for making the same. The friction torque hinge comprises a rotatable shaft, at least one frictional element and an element housing. The frictional elements are mounted on and frictionally engage the shaft. The frictional elements have an outer element shape. The element housing has an inner cavity with a shape that matches the outer element shape of the frictional elements. The element housing contacts substantially the entire outer element shape of the plurality of frictional elements. This prevents relative rotation of the element housing and the frictional elements.

13 Claims, 11 Drawing Sheets

FIG. 11

CLIP FRICTION HINGE WITH HOUSING

BACKGROUND OF THE INVENTION

The present invention relates to a frictional torque hinge. More specifically, the present invention relates to a frictional element, or multiple frictional elements, radially compressed on a shaft, over which a housing is formed.

Frictional hinge devices are known in the art to support objects at selected angular positions relative to a main body. One type of friction hinge is a spring hinge which utilizes a helical spring wrapped around a shaft. In a relaxed state, the spring has an inner diameter less than the outer diameter of the shaft to frictionally engage the shaft so that the spring and shaft will tend to rotate together. In use, the shaft is connected to a rotatable body. As the body and the shaft are rotated, one of the spring ends or "toes" is oriented to contact a stop, which is typically part of a stationary support. The engagement of the spring toe with the stop will cause the spring to slip relative to the shaft, rather than rotate with the shaft. This will generate torque. Such a spring hinge can be designed to provide a fairly constant torque or resistance to rotation throughout its range of motion.

Another type of friction hinge device is a wrap hinge with a shaft and an enclosure formed around the spring and shaft such that it encloses the shaft and spring. The spring is frictionally engaged with the shaft and therefore tends to rotate with the shaft. The enclosure surrounding the shaft, however has direct surface contact with the outer surface of the spring and prevents the spring from rotating relative to the enclosure. Thus, when the shaft is rotated relative to the enclosure, the friction between the shaft and the spring provides nearly constant torque or resistance to rotational movement throughout the range of motion of the shaft. Such a wrap spring device is disclosed in U.S. Pat. No. 5,542,505.

Another type of friction hinge device includes a shaft with a plurality of clips mounted on the shaft. Each clip has a connection portion projecting from the exterior surface. This connection portion engages a housing. Consequently, when the shaft is rotated relative to the housing, the clips are prevented from rotation via the engagement of the connection portion with the housing. The friction between the clips and the shaft upon their relative rotation provides a fairly constant torque or resistance to rotation throughout the range of motion. Such an housing is constructed separately from the clips. Great care must be taken to ensure that the housing properly engages the connection portion of the clips. Precision in the dimensions of these parts is very important.

Each of these known hinges, while providing certain advantages, also have limitations. A hinge that requires less expensive tooling in construction, requires less precision of parts in construction, that is water resistant, that provides a configuration for substantially containing lubricant, that has no moving parts in a mold during its formation, and after its formation, that has greater flexibility of hinge geometry, that allows for smaller overall size, or provides various combinations of these benefits, would be an improvement over the art of record.

BRIEF SUMMARY OF THE INVENTION

The present invention is a friction torque hinge and method for making the same. The friction torque hinge in accordance with the present invention has a rotatable shaft, one or more frictional elements, and a housing. Each frictional element has an outer edge and an aperture that receives the shaft. The frictional elements are mounted on and frictionally engage the shaft.

In one embodiment, at least some of the frictional elements include a notch that is inside the outer edge of the frictional element. The housing substantially surrounds the plurality of frictional elements and the shaft, and it substantially fills the notches of the frictional elements.

The torque friction hinge of the present invention is formed by mounting a plurality of frictional elements on a shaft such that they are frictionally engaged therewith. The shaft and clips are then placed in a mold with a cavity for receiving them. Flowable material is then injected into the mold such that the material substantially surrounds the frictional elements. The flowable material then hardens into a housing that substantially contains the frictional elements.

DETAILED DESCRIPTION

Figure 1:
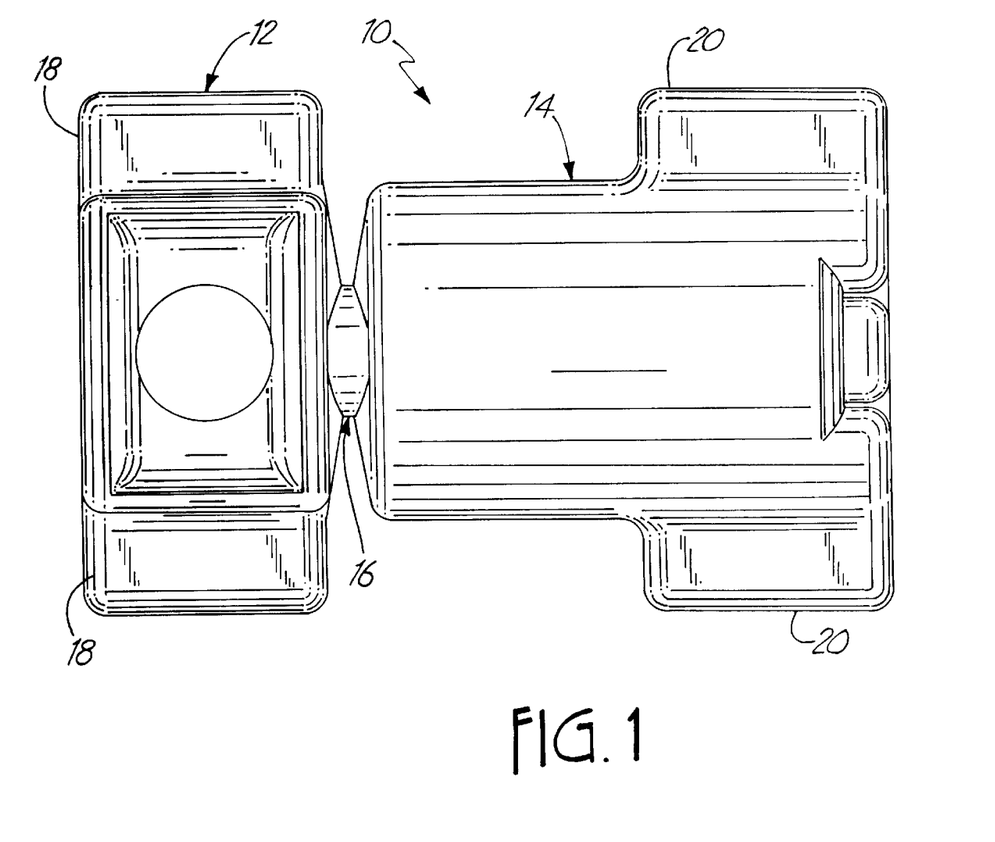
FIG. 1 is a friction torque hinge in accordance with the present invention.

FIG. 1 shows friction torque hinge 10 in accordance with the present invention. Torque hinge 10 includes end housing 12, frictional element housing 14, and shaft 16. End housing 12 includes end wings 18 and frictional element housing 14 includes frictional element wings 20.

Shaft 16 is cylindrical-shaped and coupled to end housing 12 such that shaft 16 rotates with relative rotation of end housing 12. Shaft 16 is frictionally engaged with frictional elements such as clips (not shown in FIG. 1) that are in turn coupled to housing 14. The frictional elements are coupled to frictional element housing 14 such that they rotate with relative rotation of frictional element housing 14. When shaft 16 rotates with end housing 12, hinge 10 is capable of producing torque with relative rotation of frictional element housing 14.

In operation, friction hinge 10 is used to hinge one body relative to another. For example, friction hinge 10 can be used to hinge a laptop computer screen relative to a laptop base. Specifically, end housing 12 may be mounted to a laptop computer screen using end wings 18, while frictional element housing 14 is mounted to the base of the laptop computer using frictional element wings 20. Rotation of the computer screen, and thus rotation of end housing 12, causes rotation of shaft 16 to which end housing 12 is fixed. Meanwhile, the screen and shaft 16 rotate relative to the computer base, and thus, relative to frictional element housing 14 causing the frictional elements to slip relative to shaft 16. This provides relatively constant rotational torque.

Figure 2:
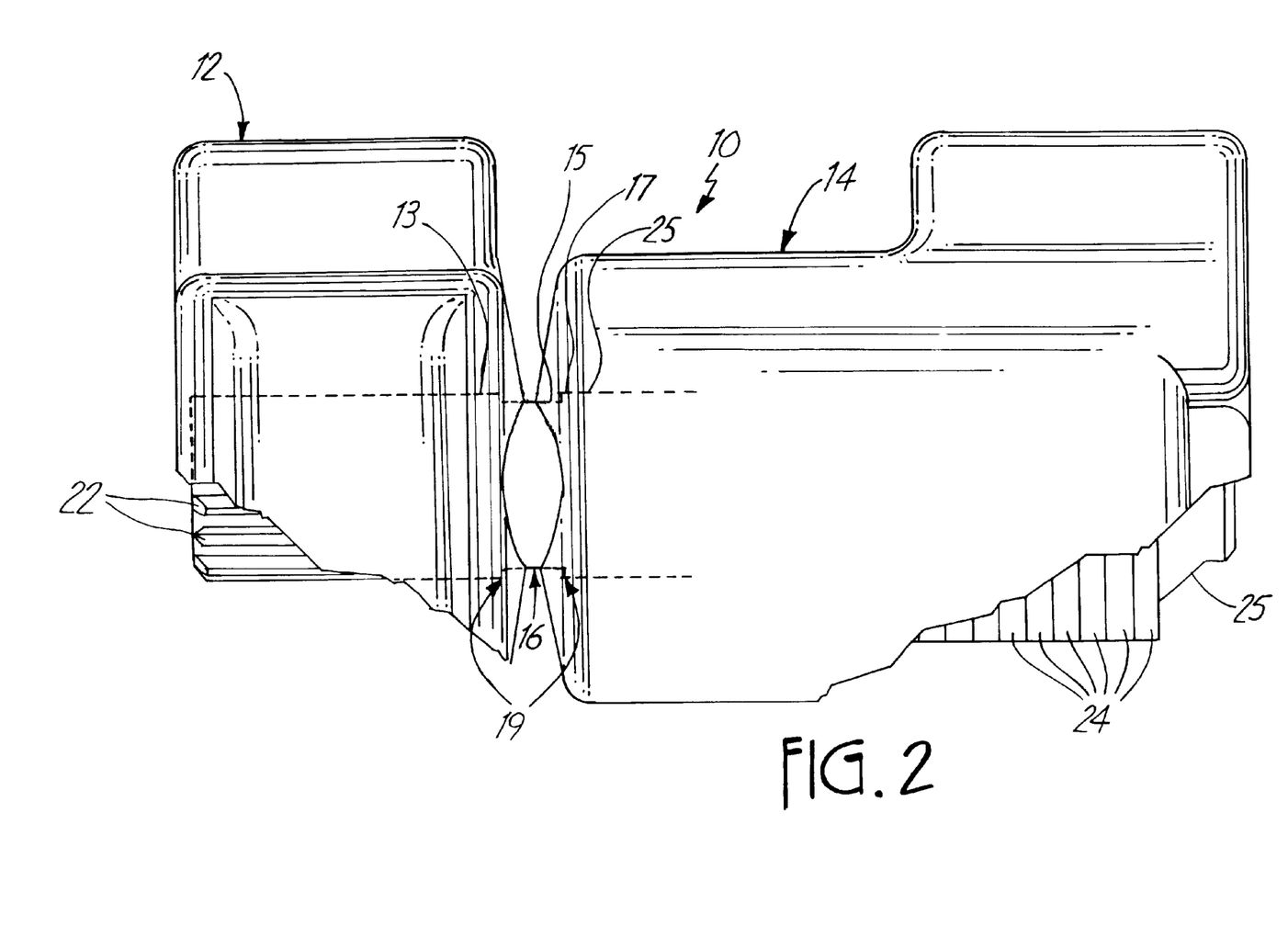
FIG. 2 shows the friction torque hinge 10 with portions of housings cut away and partially ghosted to expose the interior of the hinge.

FIG. 2 shows friction hinge 10 in accordance with the present invention. Portions of end housing 12 and frictional element housing 14 have been cut away to expose portions of friction hinge 10 inside housings 12 and 14. Furthermore, housings 12 and 14 have been partially ghosted to further show some portions of friction hinge 10 inside housings 12 and 14. Friction hinge 10 further includes clips 24 and end caps 25.

Shaft 16 has three axial lengths, a first portion 13, a second portion 15, and a third portion 17. Second portion 15 has a smaller surface diameter than first portion 13 and third portion 17, each of which have a larger surface diameter. Second portion 15 is located between first portion 13 and third portion 17. Thus, shaft 16 is "stepped." The transition between the larger surface diameter of first and third portions 13 and 17 to the smaller surface diameter of second portion 15 defines shoulders 19. First portion 13 of shaft 16 is inside head housing 12 and is also knurled such that raised ribs 22 extend throughout housing 12. Under frictional element housing 14 one or more clips 24 are mounted on third portion 17 of shaft 16. Clips 24 are mounted on shaft 16 such that they are frictionally engaged therewith. Clips 24 are mounted side-by-side such that they are in contact with each other. Clips 24 each include notches and a mouth (not shown in FIG. 2) with which frictional element housing 14 is engaged.

In operation, end housing 12 can be rotated relative to frictional element housing 14 to produce relatively constant torque. End housing 12 is engaged with the raised ribs 22 of shaft 16 such that shaft 16 will rotate with end housing 12. Frictional element housing 14 is engaged with notches (not shown in FIG. 2) of clips 24, and consequently, clips 24 rotate with frictional element housing 14. Shaft 16 is in an interference fit with clips 24, such that relative rotation of housings 12 and 14 produces a relatively constant friction torque as the friction between clips 24 and shaft 16 is overcome by the rotating force.

Figure 3:
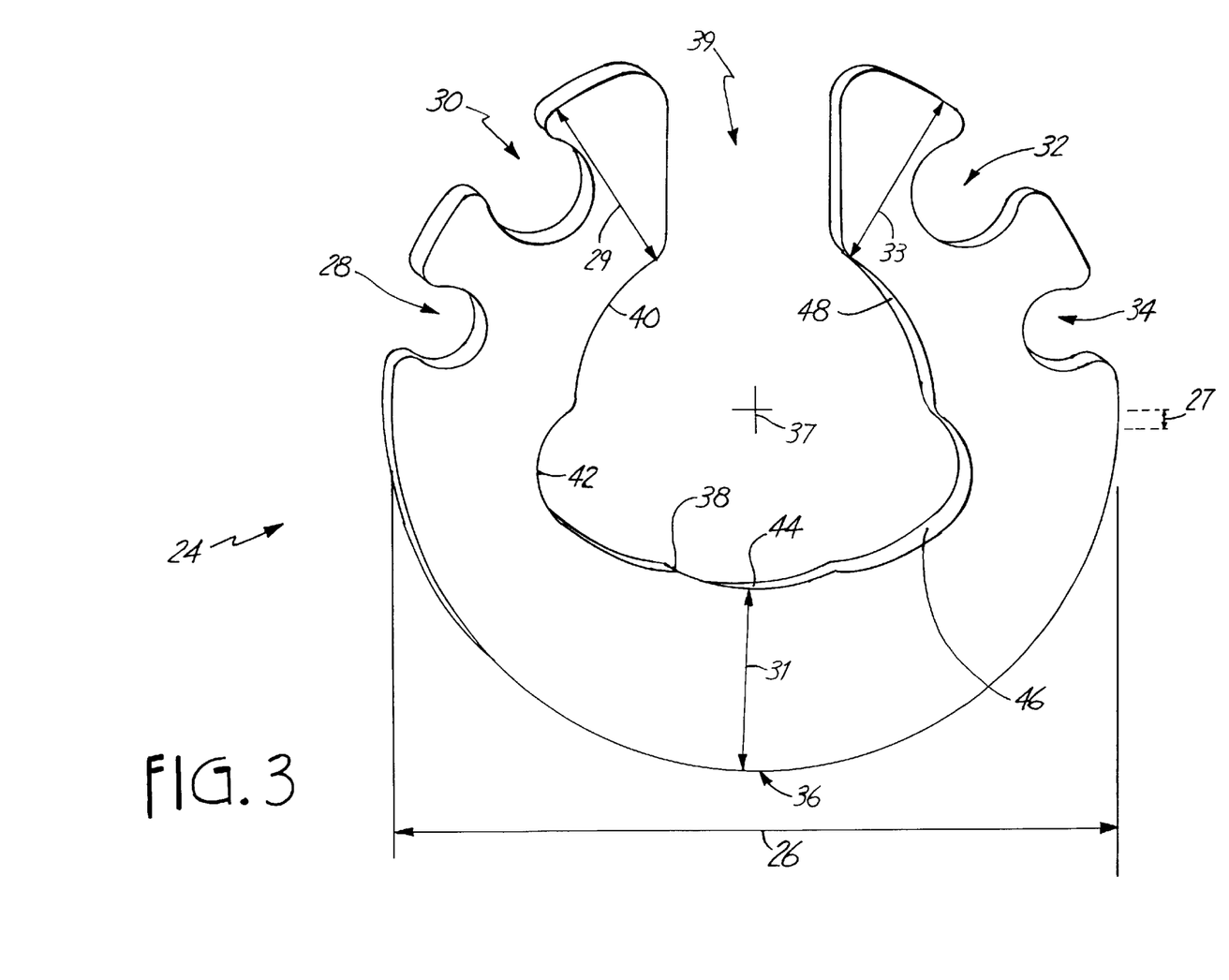
FIG. 3 shows a perspective view of a frictional element.

FIG. 3 shows a clip 24. Clip 24 is generally C-shaped. Clip 24 has a width 26 and a thickness 27. Clip 24 includes an outer edge 36 and an inner edge 38. Clip 24 also includes anchoring notches 28, 30, 32 and 34 in outer edge 36. The distance between inner and outer edges 36 and 38 define first, second and third radial widths 29, 31 and 33. Inner and outer edges 36 and 38 terminate to define clip mouth 39. Inner edge 38 includes first section 40, second section 42, third section 44, fourth section 46, and fifth section 48. A central shaft axis 37 is shown in the center of clip 24.

Figure 4:
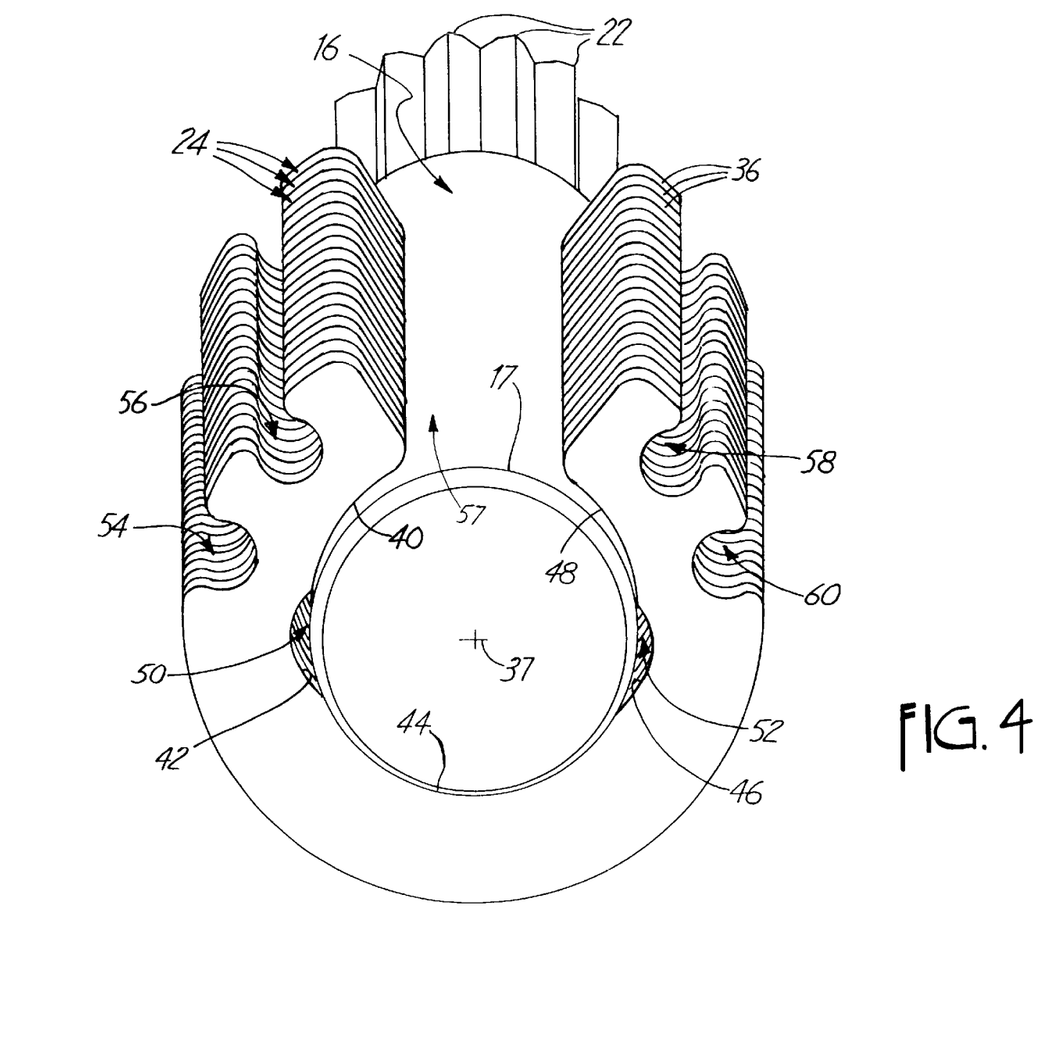
FIG. 4 shows a plurality of frictional elements assembled on a shaft.

FIG. 4 shows a plurality of clips 24 mounted on shaft 16. First, third, and fifth sections 40, 44, and 48 of inner edge 38 of clip 24 are configured to be in a same diameter relative to shaft axis 37. The diameter defined by first, third, and fifth sections 40, 44, and 48, relative to shaft axis 37, is smaller than the surface diameter of third portion 17 of shaft 16. In this way, when clips 24 are mounted on third portion 17 of shaft 16 an interference fit is created between clip 24 and shaft 16.

Second and fourth sections 42 and 46 of inner edge 38 of clip 24 extend beyond the diameter defined by first, third, and fifth sections 40, 44, and 48. In this way, when clip 24 is mounted on shaft 16 first and second pockets 50 and 52 are formed along side of shaft 16. As multiple clips 24 are stacked on shaft 16, and respective second and fourth sections 42 and 46 of inner edge 38 of clips 24 are aligned with each other, first and second pockets 50 and 52 extend along the length of shaft 16. Grease or other lubricating substances can be injected into pockets 50 and 52 in order to reduce wear between clip 24 and shaft 16. End caps 25 (not shown in FIG. 4) are mounted over shaft 16 and pushed immediately adjacent clips 24 at both ends in order to seal off pockets 50 and 52. This will retain the grease in the pockets 50 and 52 and not allow it to seep out.

In one embodiment of the present invention, the first and second pockets can be achieved by including a channel in shaft 16 along its axis. In this embodiment first, second, third, fourth and fifth sections 40, 42, 44, 46 and 48 of inner edge 38 of clip 24 can all lie in the same diameter so that the pockets are formed by the channel in shaft 16 rather than by section of clip 24. Grease or other lubricating substances can be injected into the pockets in order to reduce wear between clip 24 and shaft 16.

In one embodiment of the present invention, the first and third radial widths 29 and 33 are smaller than the second radial width 31. Clip 24 has a larger radial width 31 to accommodate bending stress that will be discussed further below in conjunction with the operation of hinge 10.

Clip 24 further includes first, second, third, and fourth anchoring notches 28, 30, 32, and 24. These anchoring notches are formed in clip 24 adjacent outer edge 36. When clips 24 are stacked upon shaft 16 as shown in FIG. 4, notches 28, 30, 32, and 34 are aligned to form first, second, third, and fourth anchoring slots 54, 56, 58 and 60. These anchoring slots 54, 56, 58, and 60 are useful in coupling clips 24 to frictional element housing 14. Frictional element housing 14 is formed over the combination of clips 24 mounted on shaft 16 such that frictional element housing 14 completely surrounds clips 24, including in anchoring slots 54, 56, 58, and 60.

Similarly, in one embodiment of the invention, clips 24 define mouth 39. When clips 24 are stacked upon shaft 16 as shown in FIG. 4, mouths 39 are aligned to form anchoring channel 57. Anchoring channel 57 is also useful in coupling clips 24 to frictional element housing 14. Frictional element housing 14 is formed over the combination of clips 24 mounted on shaft 16 such that frictional element housing 14 completely surrounds clips 24, including in anchoring channel 57. Anchoring channel 57 can be used instead of anchoring slots 54, 56, 58 and 60, or in conjunction with them. Similarly, anchoring slots 54, 56, 58 and 60, or a subset of them, can be used instead of anchoring channel 57, or in conjunction with it.

Because frictional element housing 14 is formed over the combination of clips 24 mounted on shaft 16 such that housing 14 completely surrounds clips 24, including in anchoring channel 57, grease or other lubricating substances cannot be placed in the area of mouth 39 or slot 57. If it were, housing 14 would displace the grease during the formation of housing 14 over clips 24 mounted on shaft 16. In this way, pockets 50 and 52 (or at least one of them) are important to ensure proper lubrication between clips 24 and shaft 16. It is also important that pockets 50 and 52 are sealed off, in the preferred embodiment by end caps 25. If they were not sealed, housing 14 could displace the grease in pockets 50 and 52 during the formation of housing 14. Without such proper lubrication excessive wear of hinge 10 will occur.

The assembly of friction hinge 10 is explained with reference to FIGS. 4–6. A plurality of clips 24 are mounted on shaft 16 toward the end of shaft 16 opposite raised ribs 22, such as shown in FIG.4. Grease or other lubricating substances are then injected into pockets 50 and 52 and end caps 25 are then mounted on shaft 16 to seal pockets 50 and 52.

Next, end and frictional element housings 12 and 14 formed over the combination of shaft 16 and plurality of clips 24. In one embodiment of the present invention, end and frictional element housing 12 and 14 are formed with an injection molding process. Other molding methods can also be employed to use the present invention, such as a die casting process.

Figure 5:
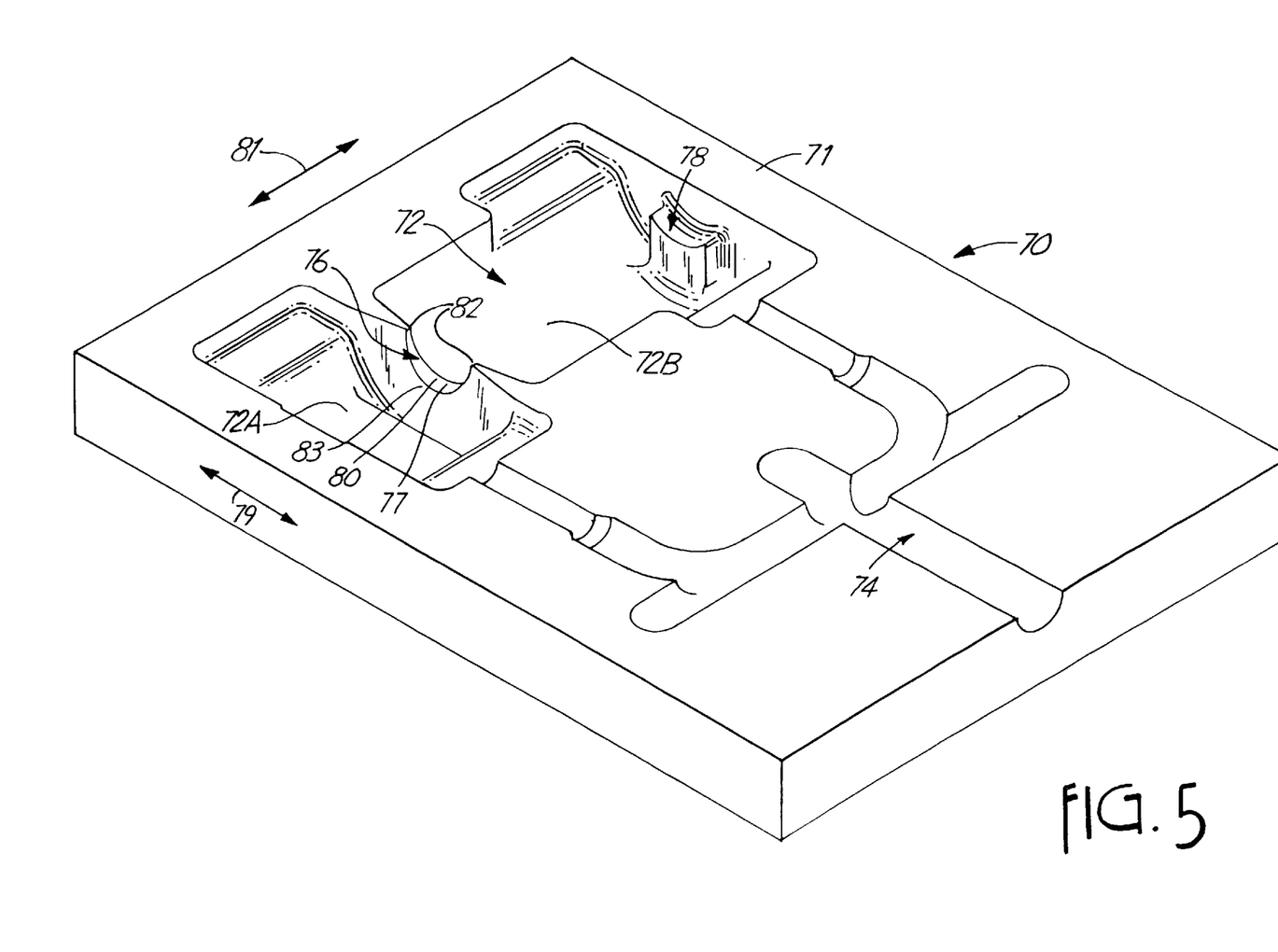
FIG. 5 shows a lower mold frame.
Figure 6:
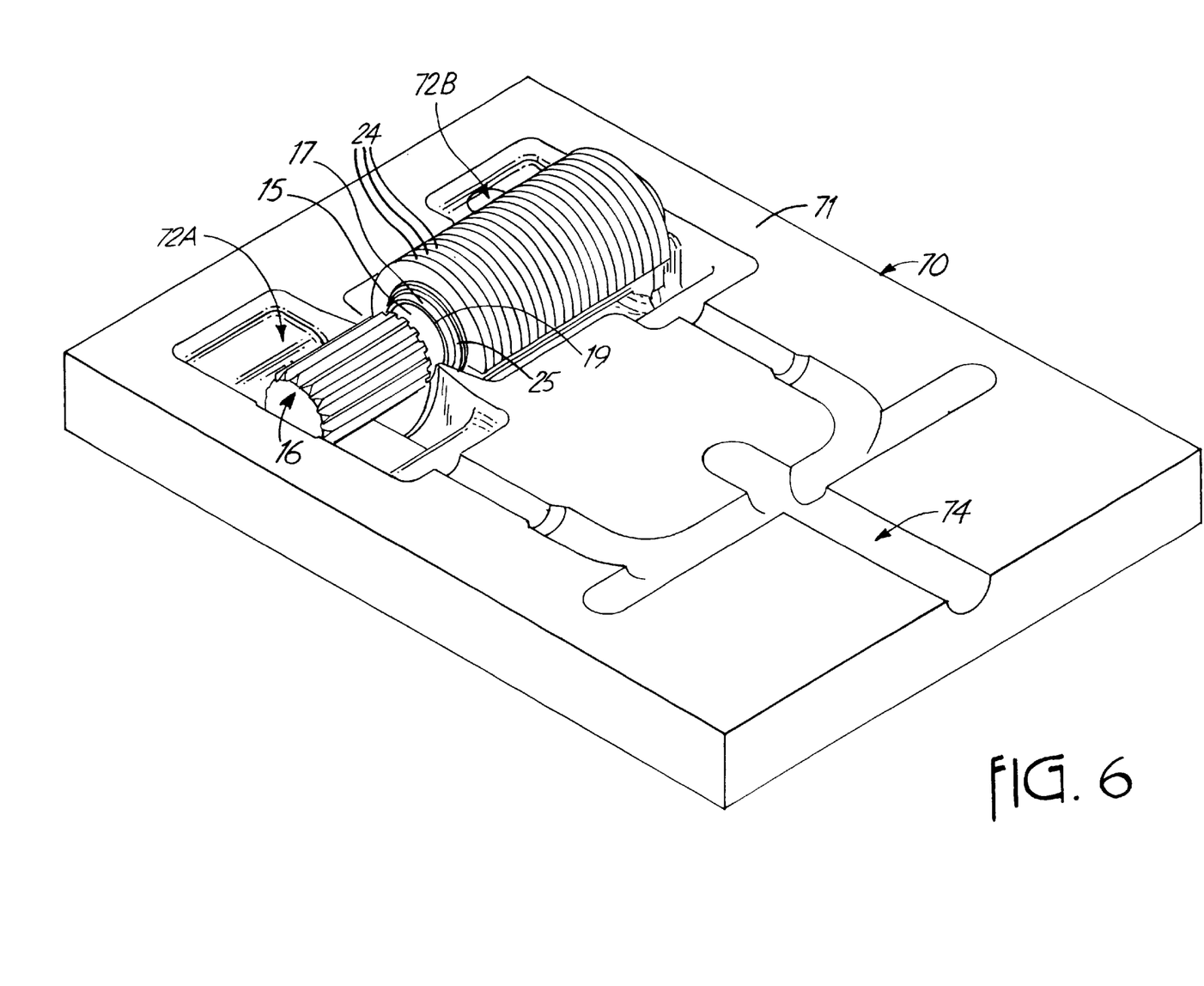
FIG. 6 shows a frictional element shaft assembly in the lower mold frame.

The combination of shaft 16 with the plurality of clips 24 are placed in a lower mold frame 70, as shown in FIGS. 5–6. Lower mold frame 70 has a top surface 71, cavity 72 and runners 74. Cavity 72 is shaped to receive the combination of shaft 16 and clips 24 in first and second cavity portions 72A and 72B. Cavity 72 in lower mold frame 70 also defines first and second shelves 76 and 78, which cradle shaft 16. Runners 74 is used to deliver injection molding material to cavity 72.

Lower mold frame 70 is joined with an upper mold frame (not shown) to surround shaft 16 and clips 24. The upper mold frame is symmetrical to, or a "mirror image" of, lower mold frame 70. Lower mold frame 70 is joined with upper mold frame along surface 71 to form a liquid-tight container substantially surrounding shaft 16 and clips 24. Once upper mold frame is joined with lower mold frame 70, flowable material is injected into cavity 72 through runners 74. The injection molding material may include any number of thermal plastic materials that flow when heated. The injection molding material that flows around shaft 16 and fills the space between the upper and lower molds and in cavity portion 72A forns end housing 12. The injection molding material that flows around a perimeter defined by the outer surface 36 of clips 24 and fills the space between the upper and lower molds and in cavity portion 72B forms frictional element housing 14. When upper and lower mold frames are removed, end housing 12 and frictional element housing 14 are left behind enclosing shaft 16 and clips 24.

Lower mold frame 70 is shaped to receive shaft 16 and clips 24. The portion of shaft 16 with raised ribs 22 fits into cavity portion 72A and clips 24 mounted on shaft 16 fit into cavity portion 72B. Lower mold frame 70 contacts shaft 16 at first shelf 76 immediately adjacent raised ribs 22. Lower mold frame 70 also contacts shaft 16 at second shelf 78. By contacting shaft 16 in two distinct locations that are separated by some distance, lower mold frame 70 (along with the upper mold frame) secures shaft 16 during the molding process and prevents side-to-side movement in the directions indicated by arrow 79.

First shelf 76 of lower mold frame 70 has a top surface 77 that is uniquely shaped to engage shaft 16. Top surface 77 lies in a plane that is cylindrical-shaped. Consequently, it contacts the lower half of shaft 16 that resides in cavity 72 when shaft 16 and clips 24 are placed in lower mold frame 70. Top surface 77 of first shelf 76 is wider at its center 80 than at its ends 82. In this way, there is more surface contact between shaft 16 and top surface 77 of shelf 76 at center 80 than there is at ends 82.

Shaft 16 is placed in lower mold frame 70 such that it contacts first shelf 76 only at the smaller surface diameter of second portion 15. The widest portion of shelf 76 is center 80 and the width of shelf 76 at center 80 is approximately the same axial length as second portion 15 of shaft 16. In this way, shoulders 19 (defined by the transition from the larger surface diameter of first and third portions 13 and 17 to the smaller surface diameter of second portion 15) engage both sides 83 of shelf 76 at center 80. Shoulders 19 engaging sides 83 of shelf 76 prevents shaft 16 from moving axially in the directions indicated by arrow 81. (And since upper mold frame is symmetrical to lower mold frame 70, it also contacts shaft 16 and clips 24 in the same way.)

Holding shaft 16, and thus clips 24, stable during the injection molding process can be important to the assembly of friction hinge 10. By assuring that shaft 16 is stable, predictable and repeatable assembly of friction hinge 10 is possible. Shaft 16 is prevented from moving in each direction indicated by arrows 79 and 81. The combination of first and second shelves 76 and 78 prevent side-to-side movement indicated by arrow 79. The stepped diameter of shaft 16, with smaller surface diameter at second portion 15 surrounded by the larger surface diameter at first and third portions 13 and 17, provides a "groove" (between shoulders 19), and shelf 76 provides a "tongue" such that this tongue and groove prevent axial movement in the direction indicated by arrow 81.

Similarly, the diameter of shaft 16 may be stepped such that it has a larger surface diameter at second portion 15 surrounded by the smaller surface diameter at first and third portions 13 and 17. In this way, shoulders 19 are still defined by the stepped diameter and may still be engaged by lower mold frame 70 to prevent axial movement. With this alternative embodiment, two spaced apart shelves (just outside both ends of second portion 15) would engage the shoulders 19 rather than the single shelf 76.

The unique shape of first shelf 76 of lower mold frame 70 and the stepped diameter of shaft 16 are also important in preventing axial movement of shaft 16 with respect to housings 12 and 14 after the formation of housings 12 and 14. First shelf 76 is narrower at its ends 82 than at its center 80. Thus, while the width of first shelf 76 at center 80 is approximately the same as the axial length of second portion 15 of shaft 16, the width of first shelf 76 at its ends 82 is significantly less than the axial length of second portion 15 of shaft 16. In this way, injection molding material that flows into cavity 72 to form housings 12 and 14 flows over shoulders 19 at ends 82. Since the width of first shelf 76 at center 80 is approximately the same as the axial length of second portion 15 of shaft 16, no injection molding material will be able to flow over shoulders 19 at center 80.

As a result, both housings 12 and 14 are formed to transition from the larger surface diameter of first and third portions 13 and 17 to the smaller surface diameter of second portion 15 of shaft 16 and over shoulders 19 as is best seen in FIG. 2, where housings 12 and 14 are partially ghosted. The resulting shapes of housings 12 and 14 leave an opening exposing shaft 16 that is "football-shaped" if viewed from the side of hinge 10, as in FIG. 2. Forming housings 12 and 14 in this way prevent shaft 16 from axial movement in the direction indicated by arrow 81 after hinge 10 is formed by at least partially engaging shoulders 19 in some areas.

In operation of hinge 10, housings 12 and 14 are rotated relative to each other. Shaft 16 is in an interference fit with clips 24, such that relative rotation of housings 12 and 14 produces a relatively constant friction torque as the friction between clips 24 and shaft 16 is overcome by the rotating force. The amount of rotating force required to overcome the friction force between clips 24 and shaft 16 varies in the present invention. The amount of friction force between clips 24 and shaft 16 is easily varied in the present invention by adding or subtracting the number of clips 24 used in hinge 10. A single clip 24 or any number of multiple clips or frictional elements can be use to practice the present invention. The more clips 24 that are used, the more rotational force or torque it will take to overcome the friction force between clips 24 and shaft 16. The less clips 24 used, for example a single clip 24, the less rotational force or torque it will take to overcome the friction force between clip 24 and shaft 16.

In operation of hinge 10, housing 14 engages clips 24 such that they do not rotate relative to each other as housings 12 and 14 are rotated relative to each other. The engagement of housing 14 and clips 24 is accomplished by forming housing 14 such that it forms even in the anchoring slots or channels defined by clips 24. Because housing 14 is formed in these anchoring slots or channels, relative rotation of clips 24 and housing 14 is prevented.

For example, clips 24 shown in FIG. 4 define first, second, third and fourth slots 54, 56, 58 and 60. When shaft 16 and clips 24 are place in upper and lower mold frames, flowable material surrounds clips 24 and also flows into first, second, third and fourth anchoring slots 54, 56, 58 and 60. In this way, housing 14 matches with extreme precision the outer edges 36 of clips 24, and also matches with extreme precision first, second, third and fourth anchoring slots 54, 56, 58 and 60. Similarly, in clips 24 with mouth 39 and anchoring channel 57, housing 14 matches anchoring channel 57 with extreme precision. In this way, the precision of the engagement between clip 24 and housing 14 is inherent in the design of the present invention and does not depend on the assembly of hinge 10.

In operation of hinge 10 when housings 12 and 14 are rotated relative to one another, the engagement of housing 14 with clips 24 and the interference fit between shaft 16 and clips 24 will cause stress on clips 24. Clips 24 will experience both "contact pressure" and "bending stress." Contact pressure is the pressure or friction between shaft 16 and clips 24 due to the interference fit between shaft 16 and clips 24. Bending stress occurs when the force from the rotation of shaft 16 tends to rotate clips 24, but clips 24 cannot rotate because they engage housing 14. This will tend to "bend" clips 24.

In one embodiment of the present invention, the first and third radial widths 29 and 33 are smaller than the second radial width 31 to accommodate for the bending stress. The bending stress tends to be greatest at the location of second radial width 31, and therefore, making that width thicker compensates for the bending stress. In another embodiment, the first, second and third radial widths 29, 31 and 33 can all be equal, as long as the selected dimensions can accommodate any bending stress.

In one embodiment of the present invention, pockets 50 and 52 are evenly spaced from mouth 39. In this way, first, third, and fifth sections 40, 44, and 48 of inner edge 38 of clip 24 have approximately the same amount of surface contact with shaft 16, and each portion is evenly spaced around shaft 16. Spacing in this way tends to even out the contact pressure between the clips 24 and shaft 16. In one embodiment, first, third, and fifth sections 40, 44, and 48 of inner edge 38 of clip 24 are each approximately 50 degrees in contact with shaft 16 relative to central shaft axis 37, while second and fourth sections 42 and 46 are each approximately 70 degrees not in contact with shaft 16 relative to central shaft axis 37.

Providing first, second, third and fourth notches 28, 30, 32 and 34 out in the location of first and third radial widths 29 and 33 and away from location of second radial width 31 has the advantage of not weakening clip 24 at a point of high bending stress. Also, locating first, second, third and fourth notches 28, 30, 32 and 34 away from pockets 50 and 52 prevents unduly weakening clip 24 at a point of high bending stress.

Housings 12 and 14 are formed using a single mold (upper and lower mold frames joined together). Using single mold tool is an improvement over prior art devices that required as many as three different tools to manufacture a hinge. This simplifies the manufacturing process and saves tooling costs. There is also no moving parts used during or after the formation of housings 12 and 14 in hinge 10. This provides advantages over the prior art. Moving parts in the formation process tend to lead to inconsistencies in manufacturing.

When housing 14 is formed over clips 24, it provides a substantially water tight seal over clips 24. There tends to be significant wear between shaft 16 and clips 24 when hinge 10 is in operation. Lubricant between shaft 16 and clips 24 helps to limit wear. Thus, keeping lubricant between shaft 16 and clips 24 and preventing foreign substances from entering between shaft 16 and clips 24 are important design features. Having the additional seal of housing 14 over shaft 16 and clips 24 provides additional protection to shaft 16 and clips 24 so as to decrease wear and protect hinge 10.

First, second, third and fourth anchoring slots 54, 56, 58 and 60 and anchoring channel 57 are inside outer edge 36 of clip 24. In other words, first, second, third and fourth anchoring slots 54, 56, 58 and 60 and anchoring channel 57 are located between central shaft axis 37 and outer edge 36 of clip 24. In this way, the overall size of hinge 10 can be smaller than previous hinges, without sacrificing performance. Since the connection or engagement between clips 24 and housing 14 is accomplished inside outer edge 36 of clips 24, the overall size of the hinge is driven by the size of clip 24, or of its outer edge, as opposed to a protrusion jutting off the clip for engaging a housing.

Although the present invention has been described with reference to preferred embodiments, workers skilled in the art will recognize that changes may be made in form and detail without departing from the spirit and scope of the invention. For example, various shapes can be used for clips 24 without departing from the spirit and scope of the invention. FIGS. 7–10 show alternative shapes for clips that can be used to achieve the advantages of the present invention.

Figure 7:
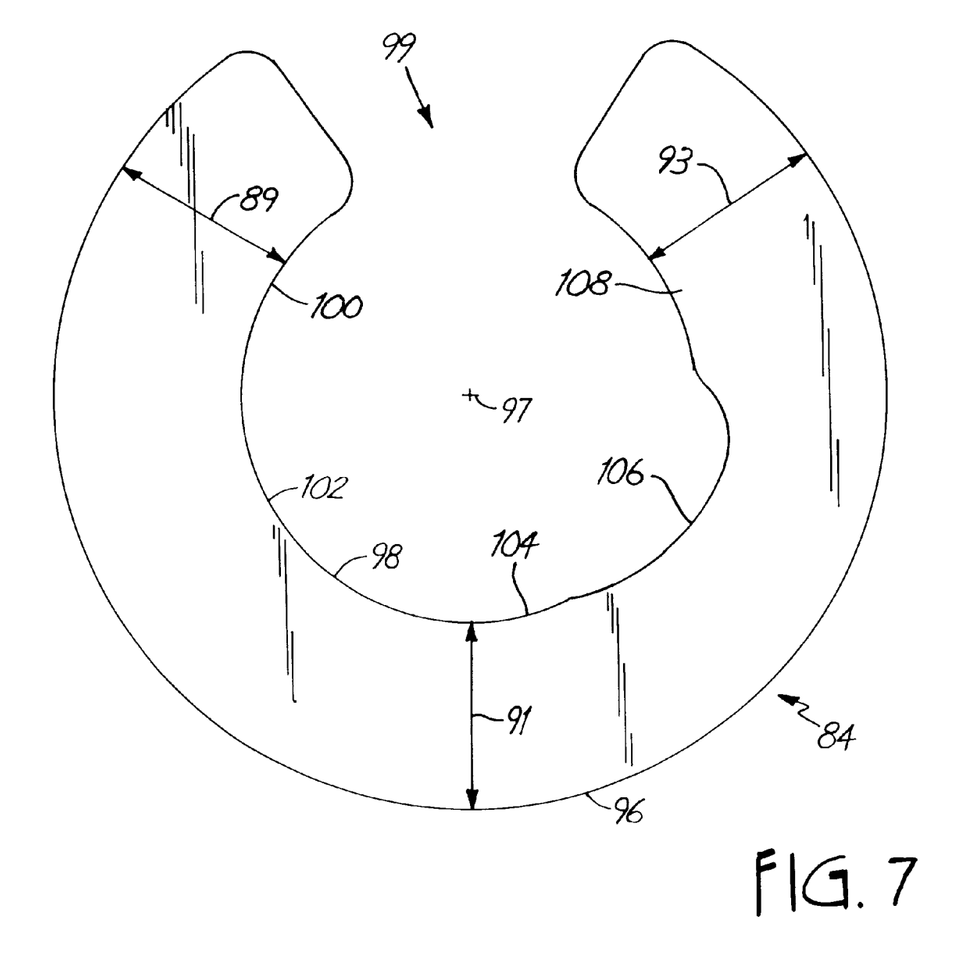
FIG. 7 shows an alternative embodiment of a clip.

FIG. 7 shows a clip 84. Clip 84 is generally C-shaped. Clip 84 includes an outer edge 96 and an inner edge 98. The distance between inner and outer edges 96 and 98 define first, second and third radial widths 89, 91 and 93, which are all equal in this embodiment. Inner and outer edges 96 and 98 terminate to define clip mouth 99. Inner edge 98 includes first section 100, second section 102, third section 104, fourth section 106, and fifth section 108. A central shaft axis 97 is shown in the center of clip 84.

In this embodiment, clip 84 is engaged with housing 14 by mouth 99 (and anchoring channel formed by aligning mouths 99) as described above. Second section 102 is in the same diameter as first section 100, third section 104, fifth section 108. In this way, only a single pocket is formed by fourth section 106, and first, second, third and fifth sections 100, 102, 104, and 108 contact shaft 16.

Figure 8:
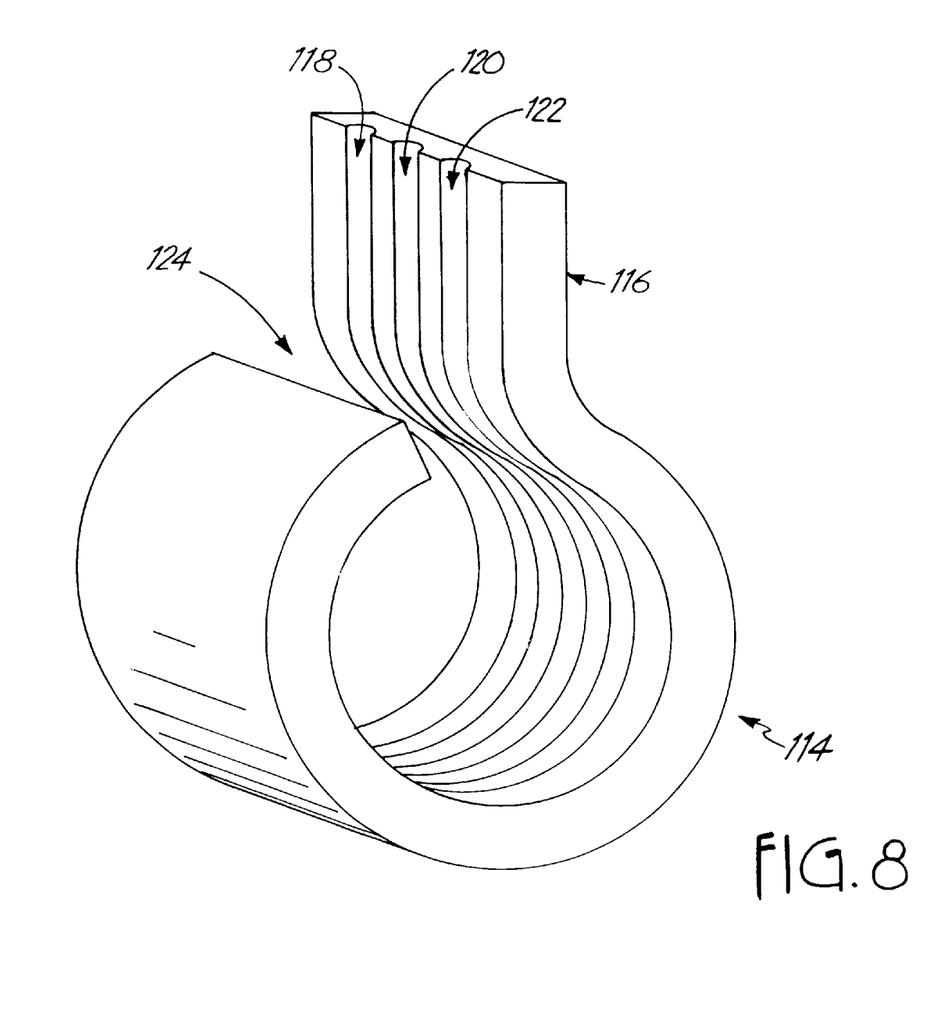
FIG. 8 shows an alternative embodiment of a clip.

FIG. 8 shows a clip 114. Clip 114 is generally in the shape of a question mark. Clip 114 includes projection 116, first, second and third pockets 118, 120 and 122 and mouth 124. In this embodiment, clip 114 is frictionally mounted on shaft 16 and is engaged with housing 14 by projection 116. Housing 14 completely surrounds projection 116 such that it is engaged therewith. First, second and third pockets 118, 120 and 122 are filled a lubricating substance to reduce wear between shaft 16 and clip 114. These pockets 118, 120 and 122 (or at least one of them) are needed because when housing 14 is formed over clip 114 any lubricant that is placed in the area of mouth 124 will be displaced, as described above.

Figure 9:
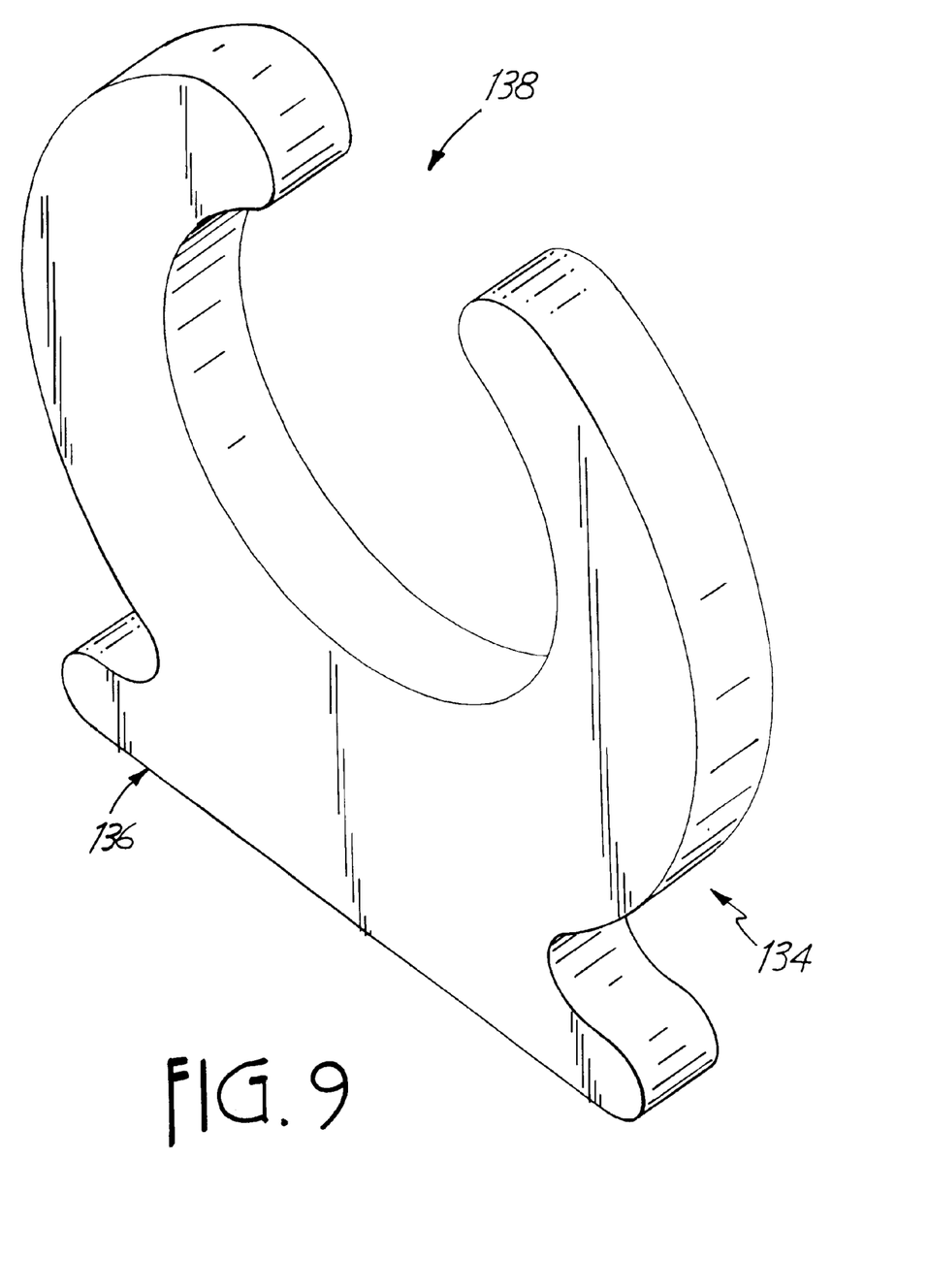
FIG. 9 shows an alternative embodiment of a clip.

FIG. 9 shows a clip 134. Clip 134 is generally C-shaped. Clip 134 includes projection 136 and mouth 138. In this embodiment, a plurality of clips 134 are frictionally mounted on shaft 16 and are engaged with housing 14 by projection 136. Housing 14 completely surrounds projection 136 such that it is engaged therewith. Pockets could also be included similar to those described with respect to clip 24 above.

Figure 10:
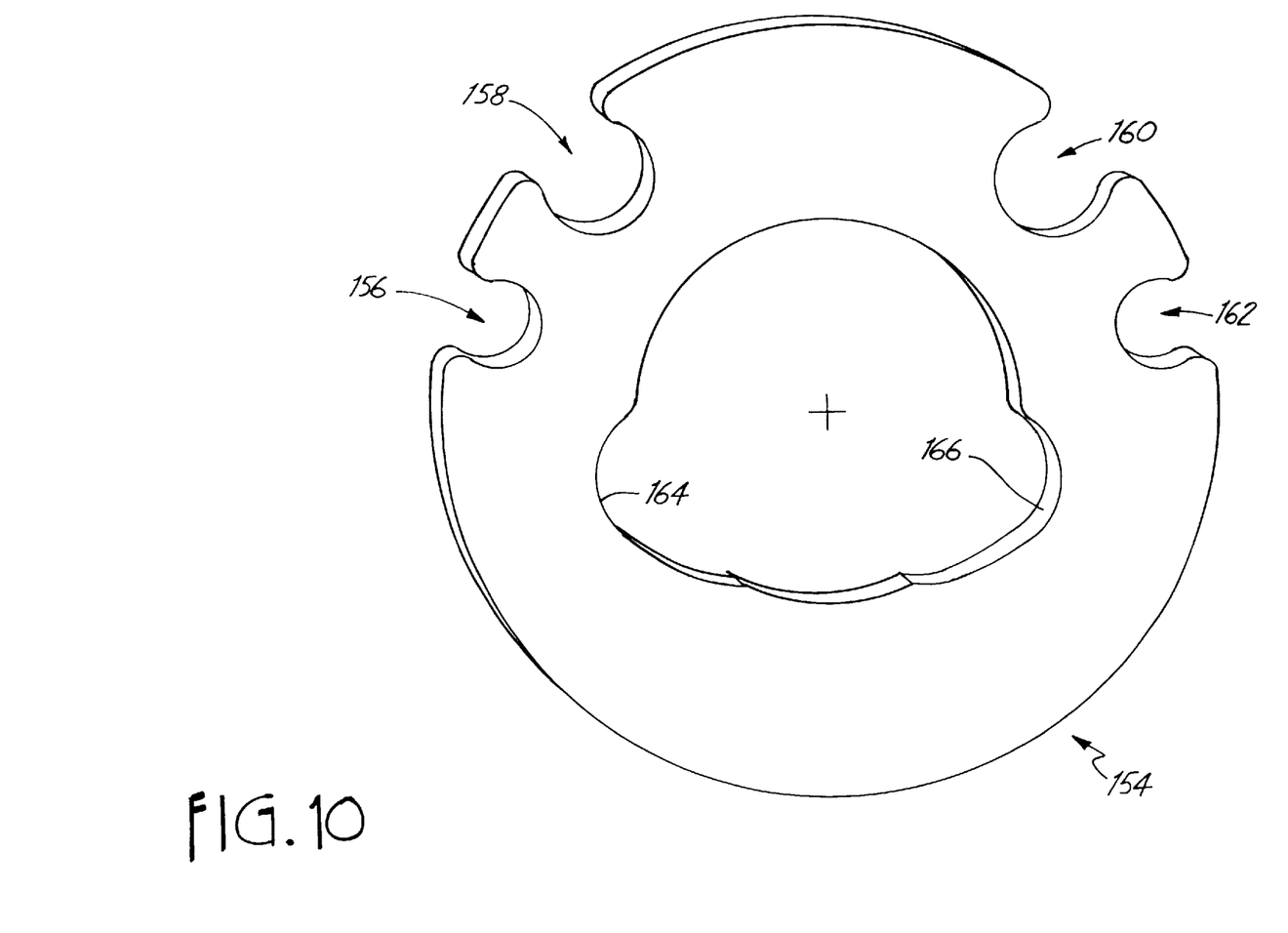
FIG. 10 shows an alternative embodiment of a clip.

FIG. 10 shows a clip 154. Clip 154 is generally O-shaped. Clip 154 includes first, second, third, and fourth notches 156, 158, 160 and 162. In this embodiment, a plurality of clips 154 are frictionally mounted on shaft 16 and are engaged with housing 14 by notches 156, 158, 160 and 162, as described above. Clips 154 also include first and second sections 164 and 166 that form pockets as described above.

Figures 11, 11A:
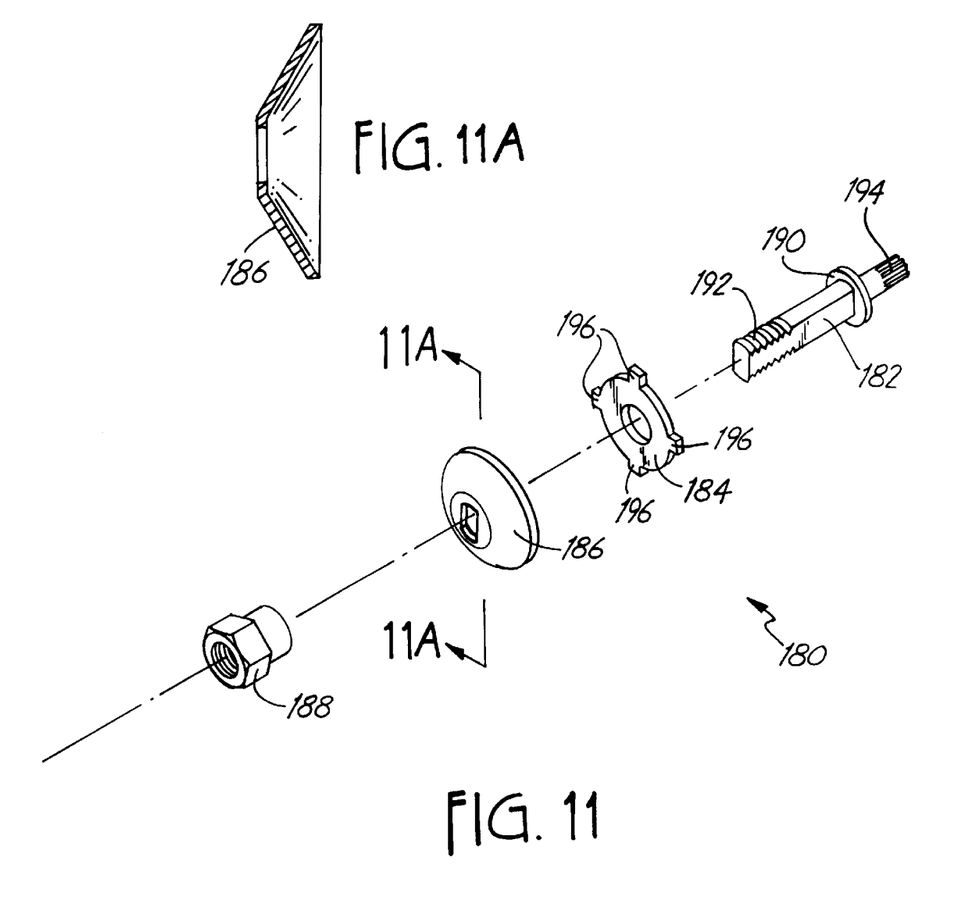
FIG. 11 shows an exploded view of an alternative frictional element-shaft assembly.
FIG. 11A shows a washer spring.

One skilled in the art will also recognize that various configurations of frictional elements can be used without departing from the spirit and scope of the invention. For example, FIG. 11 shows an alternative frictional element-shaft assembly 180 that is used to form a friction hinge in accordance with the present invention. Frictional element-shaft assembly 180 includes shaft 182, slip washer 184, washer spring 186, and lock nut 188. Shaft 182 includes shoulder 190, threaded portion 192 and knurled portion 194. Slip washer 184 includes flanges 196.

Threaded portion 192 of shaft 182 is double "D"-shaped, in that it is generally cylindrically-shaped with two sides flattened. Slip washer 184 is placed over shaft 182 against shoulder 190 and freely rotates relative to shaft 182. Washer spring 186 is then placed immediately adjacent slip washer 184. Washer spring 186 has an aperture that matches the outer diameter of shaft 182, that is, it is also double "D"-shaped. In this way, washer spring 186 locks to, and rotates with, shaft 182. Lock nut 188 is threadably connected to threaded portion 192 of shaft 182 and forcibly urges washer spring 186 against slip washer 184.

Frictional element-shaft assembly 180 is placed in a lower mold frame to form a friction hinge similar to that described above and shown in FIGS. 5 and 6. Flanges 196 will be fixedly engaged with frictional element housing 14 formed over that portion of frictional element-shaft assembly 180 and will rotate with that potion of the housing. Knurled portion 194 of shaft 182 will be fixedly engaged with end housing 12 formed over that portion of shaft 182. Thus, shaft 182 will rotate with end housing 12. When housings 12 and 14 are rotated relative to each other, the force of the washer spring 186 urged against slip washer 184 will generate friction force in the friction hinge.

Washer spring 186 is a Belleville-type washer and therefore its outer edges extend out from its aperture. When its outer edge is urged against slip washer 184, a pocket is formed. Grease or other lubricating substance may be injected into the pocket and it will be sealed off from, and not disturbed by, overmolding the housing 14.

What is claimed is:

1. A friction torque hinge comprising:
a rotatable shaft;
one or more frictional elements each having an outer edge, an outer edge feature and a surface to engage the shaft, wherein each of the frictional elements are mounted on the shaft such that their outer edges and outer edge features collectively form an outer element perimeter;
a molded element housing formed over each of the frictional elements using a flowable material that hardens around the outer element perimeter such that the element housing has an inner cavity having a shape that intimately matches the outer element perimeter of the frictional elements and such that element housing is prevented from rotating relative to the frictional elements; and
a lubricating substance trapped between the frictional elements and the shaft.

2. The friction torque hinge of claim 1 wherein the shaft and each frictional element defines a pocket immediately adjacent the shaft with the lubricating substance being in the pocket.

3. The friction torque hinge of claim 1 wherein the feature is a notch in the outer edge of each frictional element and wherein the flowable material of the element housing fills the notch.

4. The friction torque hinge of claim 3 wherein each frictional element is generally c-shaped thereby defining an opening in the outer edge and wherein each frictional element has a varying radial width such that the radial width near the opening is at its smallest, thereby decreasing bending stress in order to maximize the surface pressure at the friction interface and maintain the greatest torque in the smallest overall size.

5. The friction torque hinge of claim 3 wherein the notch of each element is aligned to form a slot which is engaged with the molded housing.

6. The friction torque hinge of claim 1 wherein the feature is a mouth in the outer edge of each frictional element and wherein the flowable material of the element housing fills the mouth.

7. The friction torque hinge of claim 6 wherein each frictional element includes two pockets immediately adjacent the shaft and wherein the pockets and the mouth are evenly spaced from each other such that the frictional element contacts the shaft in three evenly spaced apart locations to optimally distribute the forces between the friction element and the shaft.

8. The friction torque hinge of claim 1 wherein the feature is a projection in the outer edge of the element and wherein the element housing surrounds and engages the projection.

9. The friction torque hinge of claim 1 further comprising:
the shaft having a first and second diameter surface thereby defining a shoulder in the transition from the first to the second diameter surface; and
the element housing at least partially formed over the shoulder in the shaft such that the flowable material flows over the shoulder and then hardens thereby preventing axial movement of that shaft relative to the element housing.

10. The friction torque hinge of claim 1 further including an end housing formed over a portion of the shaft and rigidly attached thereto such that frictional torque is produced by the relative rotation of end housing and element housing.

11. A friction torque hinge comprising:
a rotatable shaft;
a plurality of frictional elements each having a width, a thickness, an outer edge, an outer edge feature and an axial aperture to receive the shaft, wherein the width is greater than the thickness and wherein the frictional elements are mounted on the shaft such that their outer edges and outer edge features collectively form an outer element perimeter; and
a molded element housing formed over each of the frictional elements using a flowable material that flows completely around the outer element perimeter and then hardens around the outer element perimeter such that the element housing has an inner cavity having a shape that intimately matches the outer element perimeter of the frictional elements and such that the element housing is prevented from rotating relative to the frictional elements.

12. The friction torque hinge of claim 11 wherein the features are notches inside the outer edge that are aligned to form a slot that engages the housing preventing relative rotation of the elements to each other and to the housing.

13. A friction torque hinge comprising:

a rotatable shaft;

one or more shaft elements each having an outer edge and each connected to the shaft to prevent relative rotation with the shaft;

one or more frictional elements each having an outer edge, an outer edge feature, and a surface to frictionally engage the shaft elements wherein the frictional elements are mounted on the shaft such that their outer edges and outer edge features, and the outer edges of the shaft elements, collectively form an outer element perimeter and wherein the frictional elements slip relative to the shaft;

an element housing with an inner cavity having a shape that matches the outer element perimeter of the frictional and shaft elements such that the element housing engages the entire perimeter of the frictional and shaft elements and preventing relative rotation of the element housing and the frictional elements; and a lubricating substance trapped between the frictional elements and the shaft elements.

* * * * *

UNITED STATES PATENT AND TRADEMARK OFFICE
CERTIFICATE OF CORRECTION

PATENT NO.    : 6,530,123 B1
DATED         : March 11, 2003
INVENTOR(S)   : David Wahlstedt It is certified that error appears in the above-identified patent and that said Letters Patent is hereby corrected as shown below:

Column 1,
Line 45, after "such an", insert -- arrangement is described in commonly owned U.S. Patent No. 5,697,125. Generally, such a friction hinge requires multiple piece construction, that is, the --

Signed and Sealed this

Twenty-first Day of October, 2003

JAMES E. ROGAN
*Director of the United States Patent and Trademark Office*